Jan. 23, 1962 T. G. COWAN 3,018,152

MOUNTING AND OPERATING MEANS FOR A PNEUMOSTATIC TRANSDUCER HEAD

Filed Dec. 30, 1958 2 Sheets-Sheet 1

INVENTOR.
TYSON G. COWAN

BY Hansen and Lane

ATTORNEYS

MOUNTING AND OPERATING MEANS FOR A PNEUMOSTATIC TRANSDUCER HEAD

Filed Dec. 30, 1958

2 Sheets-Sheet 2

INVENTOR.
TYSON G. COWAN
BY Hansen and Lane
ATTORNEYS

United States Patent Office 3,018,152

Patented Jan. 23, 1962

3,018,152

MOUNTING AND OPERATING MEANS FOR A PNEUMOSTATIC TRANSDUCER HEAD

Tyson G. Cowan, Campbell, Calif., assignor to International Business Machines Corporation, New York, N.Y., a corporation of New York Filed Dec. 30, 1958, Ser. No. 783,876
14 Claims. (Cl. 346—74)

The present invention relates to transducers, and pertains more particularly to mechanism for mounting an air bearing or pneumostatic transducer head, and for moving the latter into and out of operative relation with a magnetic record surface.

In electronic calculating mechanisms it is common practice to employ records having one or more surfaces thereof coated with magnetically permeable material, such as iron oxide, and to employ transducers for storing and retrieving magnetic information bits on such record.

It is also more or less common practice to employ an air bearing for supporting a transducer head in spaced, but closely adjacent, relation to such record surface. With such an air bearing supported transducer head, it is important that means be provided for moving the transducer head rapidly into and out of operative relation with a desired record track on a record and in proper air bearing supported relation with such record.

The present invention provides improved mechanism for mounting a transducer head of a type adapted for air bearing support on a conforming, relatively moving record surface.

The invention also provides improved means for supporting an air bearing transducer head, with the head biased into sealing contacting relation with a pair of ducted bearing balls interposed between the head and a pair of laterally spaced flexible support arms, whereby the head is free for gimbal movement for conforming to a moving record surface, and is retained against lateral displacement from a record track on the record surface.

A further object of the invention is to provide an air actuated bellows, operating in conjunction with the air supply for air bearing support of a transducer head on a record surface, for controlling movement of the transducer head into and out of air supported relation with such record surface.

A further object of the invention is to provide a transducer support arm having novel, flexible, gimbal support means on the free end thereof for supporting a transducer head.

A still further object of the invention is to provide unequal resilient support for the two sides of an air bearing transducer head relative to the direction of movement of a record surface adjacent thereto, whereby, when the head is moved rapidly toward such moving record surface, the head will tilt slightly so that its trailing edge, relative to the direction of record travel, will move toward the record slightly in advance of its leading edge, thereby to insure proper initial air bearing support of the head on the record.

These, and other objects and advantages of the invention will be apparent from the following description and the accompanying drawings, wherein.

Figures 1, 2, 3:
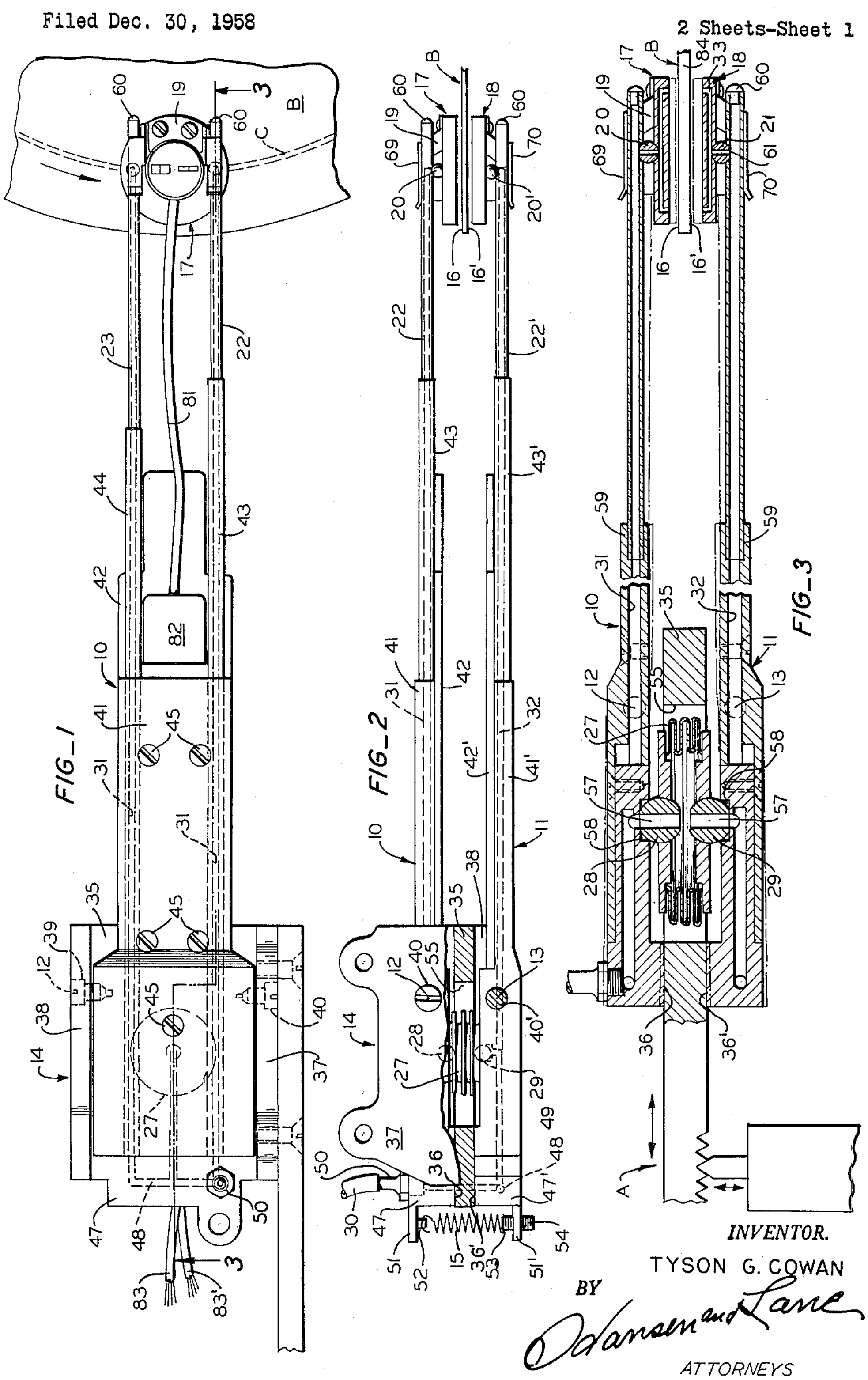
FIG. 1 is a plan view of a transducer head support mechanism embodying the invention, portions of the support arms being broken away, and a fragment of a record being shown.
FIG. 2 is a side elevational view of the structure shown in FIG. 1, a portion of the support frame being broken away.

FIG. 3 is an enlarged, somewhat diagrammatic, sectional view taken along line 3—3 of FIG. 1, portions being broken away, the solid lines showing the position of the arms when resiliently biased to separated position clear of a record, the broken lines showing the arms swung toward each other to bring the transducer heads into operative, air bearing relation with the record, indexing means being indicated diagrammatically.

Figures 4, 5, 6, 7:
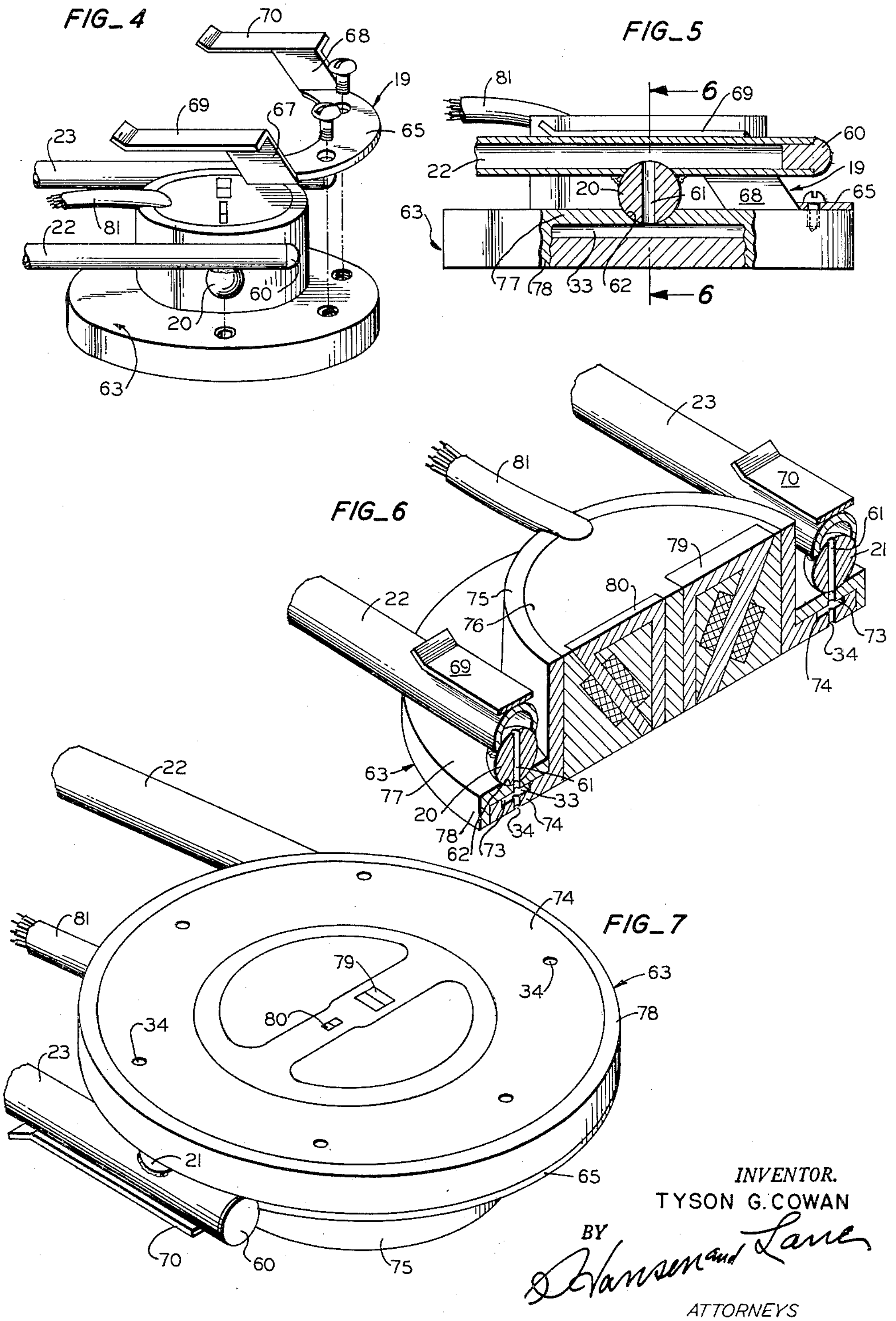

FIG. 4 is an enlarged, exploded, perspective view of one of the transducer head assembly of FIGS. 1–3.

FIG. 5 is a longitudinal sectional view through the head assembly of FIG. 4 showing the parts in assembled condition.

FIG. 6 is a further enlarged, perspective, sectional view taken along line 6—6 of FIG. 5.

FIG. 7 is a similarly enlarged perspective view showing the under side of the head assembly of FIGS. 4–6.

Briefly, the invention comprises a pair of access arms 10 and 11 (FIGS. 1–3), mounted on an access frame 14 for rocking movement about a pair of axes 12 and 13, respectively. A coil spring 15, held in tension between the outer ends of the arms 10 and 11, urges the latter toward their inoperative positions shown in FIG. 2, and in solid lines in FIG. 3. The access frame 14 is operated in a well known manner by suitable indexing mechanism indicated diagrammatically at A, FIG. 3, for moving a pair of transducer heads 17 and 18, mounted one on the inner end of each of the arms 10 and 11, into register with selected tracks on opposite sides of a magnetic record B for storing and retrieving information bits thereon, for use in a well known type of random access mechanism of a type used in electronic calculating and related machines.

Each of the transducer heads 17 and 18 is biased by a spring clip 19, best shown in FIG. 4, into sealed, swivel engagement with a pair of diametrically perforated bearing balls 20 and 21, secured to the free end portions of a pair of flexible spring tubes 22 and 23, respectively. The latter comprise the inner terminal portions of each of the access arms 10 and 11. The spring tubes 22 and 23 are of similar material, but of different lengths, with the shorter, and therefore stiffer, of said tubes connected to the trailing side of the head relative to the direction of travel of the record surface adjacent thereto. Therefore, when the arms 10 and 11 are swung from their solid inoperative position of FIG. 3, to their broken line operative position of the same figure, the trailing side of each head will approach the record B slightly in advance of the leading side of such head, thereby to insure proper initial air bearing support of the head on the record.

An air actuated bellows 27 for moving the heads into operative relation with the record B is mounted between the outer ends of the access arms 10 and 11, and a pair of diametrically perforated bearing balls 28 and 29 are secured one centrally of each end of the bellows for sealed pivotal engagement of the latter with the access arms 10 and 11, respectively.

An air inlet hose 30, attached to the upper access arm 10, communicates through air passages 31 provided in said arm with the interior of the bellows 27, with air passages 32 in the lower arm 11, and through an annular passage 33 in each of the transducer heads 17 and 18 and exists through air bearing orifices 34 (FIG. 3 and 5–7) provided in each of the transducer heads.

Referring to the drawings in detail, the access frame 14 is mounted for lengthwise, traversing, indexing movement by the indexing mechanism A (FIG. 3). Since the indexing mechanism is not a feature of the present invention, it is not illustrated in detail herein. The frame 14 positions the access arms 10 and 11 substantially radially of a record B (FIGS. 1–3) with which they are to be used, and on opposite sides thereof, and the indexing means A is employed in a well known manner to bring the transducer heads 17 and 18 into register with a selected concentric circular track C on each magnetic coated record surface 16 and 16'.

The illustrative access frame 14 may be of light weight metal, such as aluminum, and comprises a central transverse web portion 35, and side plates 37 and 38 secured fixedly and perpendicularly to opposite longitudinal edges of the web 35. Two pairs of pivot screws 39 and 40, screwed into axially aligned pairs of threaded holes provided therefor in opposite side plates 37 and 38 of the access frame 14, journal the arms 10 and 11 for rocking movement on the access frame 14. The arms 10 and 11 are generally similar to each other, but are mounted in relatively inverted condition. Therefore, except to point out slight differences between them, the upper arm 10 only will be described in detail herein, and the corresponding parts of the lower arm will be designated by the same reference numerals with the prime (') added.

The upper access arm 10 comprises matching upper and lower plate portions 41 and 42, arranged to receive therebetween a pair of square tubes 43 and 44. The arm plates 41 and 42 are secured together, and in gripping relation with the tubes 43 and 44, by machine screws 45.

A manifold block 47 (FIGS. 1 and 2) is mounted on the outer end of the arm 10, and has a manifold passage 48 therein for communicating with the bores of the square tubes 43 and 44, and also with a passage 49 communicating with the interior of the bellows 27. An air inlet fitting 50 opening into the manifold passage 48, is provided on the manifold block 47, and the compressed air supply hose 30 is connected to said fitting. The hose 30 communicates with a suitable supply of compressed air at a desired pressure, for example, 40 pounds p.s.i.

An endwise extension 51 on the upper manifold block 47 is provided with a spring anchor pin 52 and the upper end of the tension coil spring 15 is connected thereto. An annulus 53 formed on the lower end of the coil spring 15 is mounted for relative rotative movement in an annular groove provided therefor around the upper end of a lower threaded spring anchor pin 54, which is screwed into a threaded hole provided therefor in the lower endwise extension 51'. By turning the pin 54 the tension of the spring 15 may be adjusted as desired.

The bellows 27 (FIGS. 1–3) is mounted with free lateral clearance in a hole 55 provided therefor in the frame web 35, and may be a conventional type of metal bellows, except for the balls 28 and 29, one of which is secured in sealed relation centrally of each end of the bellows 27. Each of the balls 28 and 29 is provided with a hole 57 diametrically therethrough and aligned axially of the bellows 27 for communicating the interior of the bellows with the passages 31 and 32 in the upper and lower arms 10 and 11, respectively.

The balls 28 and 29 fit for sealed, universal, swivel movement into recesses 58 (FIG. 3) provided one in each of the arms 10 and 11. The outer ends of the arms 10 and 11 bear on the frame web 35 at 36 and 36' (FIGS. 2 and 3) to limit the rocking action of the arms under the biasing action of the spring 15 which normally holds the arms in their inoperative positions shown in FIG. 2, and in solid lines in FIG. 3.

The square tubes 43 and 44 of each arm are of quite rigid material, and preferably are of different lengths as shown in FIG. 1. The square tube 43 on the trailing side of the transducer head 17, relative to the direction of record movement therebeneath, is slightly longer than the other square tube 44.

Mounted co-axially on the inner ends of each pair of square tubes 43 and 44 are the two relatively small diameter tubes 22 and 23, which preferably are of similar round, springy, tubular material, such as, for example, hypodomeric needle tubing. These small tubes 22 and 23 preferably are secured in counterbores 59 (FIG. 3) provided therefor in the inner ends of their respective square tubes 43 and 44. The free inner end of each of the small tubes 22 and 23 is closed and sealed as at 60, and these small tubes terminate at equal distances from the opposite end of their respective arms 10 and 11. Thus the small tube 22 on the trailing side of each transducer head 17 and 18, relative to the direction of travel of the record B, is shorter, and therefore stiffer, than the other small tube 23 on the leading side of said each head 17 and 18, the purpose of which will be made clear during the description of the operation of the invention.

The small bearing balls 20 and 21 which are mounted (FIGS. 3–6) on the inner sides of the small tubes 22 and 23, respectively, are secured in sealed relation thereto, and a hole 61 extends diametrically through each of these balls and communicates with the bore of the small tube upon which the ball is mounted. Each of the balls 20 and 21 fits for sealed, universal swivel movement into a recess 62 (FIG. 4–6) provided therefor on diametrically opposite sides of a marginal annular flange portion 63 of each transducer head 17 and 18. The balls 20 and 21 are retained in sealed, bearing relation with each head by the spring clip 19, best shown in FIG. 4. This clip 19 has an arcuate mounting portion 65 which fits onto the flange 63 around the inward side of each transducer head, and is provided with upstanding portions 67 and 68, one on each end thereof. Outwardly extending flat spring portions 69 and 70 are provided, one on the upper end of each of the upstanding end portions 67 and 68, to overlie the tubes 20 and 21 and resiliently urge the latter toward their respective head flanges 63 and 63'. The diametrical hole 61 through each of the balls 20 and 21 communicates the bores of the small tubes 22 and 23 with the annular air passage 33 within each head flange 63. This passage 33 is formed, as best shown in FIGS. 5 and 6, by an annular groove 73 in the upper surface of an annular flange 74 formed integrally with a cylindrical head casing 75 for the central portion of each transducer head 17 and 18, and by an overlying annular member 77 having a downturned outer flange 78 thereon. The annular member 77 fits over the upper side of the flange 74 and closes the groove 73 therein, thereby providing the annular air passage 33. The air escape orifices 34 (FIGS. 6 and 7) extend through the bottom of the flange 63 and communicate with the annular passage 33 therein, so that air jets emerging from these orifices provide air bearing support for each head on a record B.

A recording transducer element 79, and a reading transducer element 80 are sealed in a well known manner in a suitable electrically insulative matrix 76 in the head casing 75.

A usual conductor cable 81 extends from the transducer elements 79 and 80 through a conventional jack 82 and cable 83 for connection to usual electrical and electronic mechanisms (not shown) with which the invention is intended to be used.

In using the present invention, the access frame 14, with its arms 10 and 11 mounted for rocking movement thereon as shown in FIGS. 1–3, is moved by suitable control mechanism, such as the indexing means A, to position the transducer elements 79 and 80 in register with a desired record track C on a selected record B. The record B may be of a well known type comprising a body portion 84 (FIG. 3) which may be of light weight non-magnetic metal, such as, for example, aluminum, with a surface coating 16 of iron oxide or other suitable magnetically permeable material on one or both sides thereof. In the present instance such coating is provided on both sides of the record, since the transducer heads 17 and 18 are mounted for operation on opposite sides of the same record.

When compressed air is introduced by conventional means, not shown, through the hose 30 and inlet fitting 50 into the upper manifold passage 48, the air flows simultaneously into the bores of the square tubes 43 and 44 and also through the passage 49 and the upper perforated bellows ball 28 into the bellows 27. The air flowing into the square tubes 43 and 44 of the upper arm 10 flows therethrough and thence through the small spring tubes 22 and 23 and the annular passage 33 and exits through the orifices 34. The air flowing through the upper perforated bellows ball 28 passes through the bellows 27, expanding the latter, thence through the lower bellows ball 29, the lower manifold passage 38', the lower square tubes 43' and 44', the lower small tubes 22' and 23', the annular passage 33' of the lower transducer head 11, and exits through the air bearing orifices 34' in the lower head 11 in the same manner as described for the upper arm 10. This entire air supplying is substantially instantaneous, so that by the time the increase of pressure in the bellows 27 overcomes the force of the spring 15 and swings the outer ends of the arms 10 and 11 apart to their broken line positions of FIG. 3, thereby moving the inner ends of the arms 10 and 11 and the transducer heads 17 and 18 mounted thereon inwardly toward the record B, air jets for air bearing support of the heads will be ejected from the head orifices 34.

It is well known that when a member, having a flat surface thereon, such as the record B, moves along an ordinate of such surface, such movement will produce a laminar flow of air along such surface. Such laminar air stream created along the flat surface 16 and 16' by the rotation of the record B, of itself would have an air bearing or so-called pneumodynamic supporting effect on the transducer heads 17 and 18. However, in the event that the leading edge of one of the transducer heads, relative to the direction of its relative movement with the record, should approach the record ahead of the trailing edge of the head, such action would tend to cause such leading edge to penetrate this laminar air stream produced by the rotation of the record, resulting in possibly damaging impact on the head with the record surface. It is desirable, therefore, that the trailing edge of each transducer head approach the record slightly in advance of its leading edge. This result is produced in the present mechanism by the difference in length, and therefore stiffness, between the small, springy, tubular arm portions 22 and 23. The square tubes 43 and 44 are sufficiently rigid so that they do not deflect appreciably during the expansion of the bellows 27, and any bending effect in the arms 10 and 11 is thus substantially restricted to the smaller tubes 22 and 23.

For moving the transducer heads 17 and 18 away from the record B to their inoperative positions shown in FIG. 2, and in solid lines in FIG. 3, the compressed air supply to the fitting 50 is shut off, and the hose 30 may thereupon be vented to atmosphere by conventional valve means, not shown. The resultant reduction of pressure in the bellows 27 allows the coil spring 15 to draw the outer ends of the arms 10 and 11 toward each other and into supported engagement with the frame web 35 as shown in FIG. 2 and in solid lines in FIG. 3, thereby swinging the heads 17 and 18 clear of the record B.

An advantage of the present invention lies in its "fail safe" character, since, should the air supply fail, resulting in a loss of bearing air, the same loss of air would result in a retraction of the heads to their inoperative, broken line positions of FIG. 3, thus preventing damage to either the heads or the record, which might result from a failure of the bearing air alone.

The invention provides a simple, positive and rapidly acting control mechanism for the access arms of a pneumostatic transducer head, and one which is maintenance free over long periods of time. It also provides an improved access arm structure and mounting means for such transducer heads, and insures that the heads will be brought properly into operative, air bearing supported relation with a record.

While I have illustrated and described a preferred embodiment of the invention, it will be understood, however, that various changes and modifications may be made in the details thereof without departing from the scope of the invention as set forth in the appended claims.

Having thus described the invention, what I claim as new and desire to protect by Letters Patent is defined in the following claims.

I claim:

1. In a mechanism for magnetic recording including a record having a moving magnetic recording surface thereon, a transducer having a surface thereof formed to conform with the recording surface, and having a plurality of air bearing orifices in said transducer surface; transducer support means including a pair of flexible tubular arm members, a bearing ball interposed between each tubular member and a transducer and having an opening therethrough communicating the interior of said each tubular member with the transducer orifices, each bearing ball being free for universal swivel movement with one of the members between which it is interposed, and means interconnecting the arm members and the transducer for retaining said arm members and transducer against separation.

2. In a mechanism for magnetic recording including a record having a moving magnetic recording surface thereon, a transducer having a surface thereon formed to conform with the recording surface, and having a plurality of air bearing orifices in said transducer surface; transducer support means including a pair of flexible tubular arm members, a bearing ball interposed in universal swiveling relation between a side of each tubular member and the transducer and having an opening therethrough communicating the interior of said each tubular member with the transducer orifices, and a pair of flat spring elements attached to said transducer at a selected angle to the conforming surface of said transducer and bearing against said flexible tubular members, thereby positioning said transducer relative to said tubular members and retaining the balls in spring gripped relation between the tubular members and the transducer.

3. In a mechanism for magnetic recording including a record having a moving magnetic recording surface thereon, a transducer having a surface thereof formed to conform with the recording surface, and having a plurality of air bearing orifices in said transducer surface; transducer support means including a support frame, a support arm mounted for rocking movement thereon, a pair of flexible tubular members comprising the terminal portion of said arm, a bearing ball member interposed between each tubular member and the transducer and having an opening therethrough communicating the interior of each tubular member with the transducer orifices, and an actuating bellows operatively connected to said arm remotely from the transducer and openly communicating with the interior of each tubular member.

4. In a recording apparatus comprising a magnetic coated record surface moving in a direction of a coordinate of said surface, and a transducer support arm extending laterally of said record surface; a pair of resilient support elements comprising a terminal portion of said arm, a bearing ball secured to a side of each of said terminal portions, a transducer having a pair of recesses each adapted to receive in sealing relation, one of said bearing balls for universal pivotal movement therein, and a spring clip attached to said transducer and having a pair of spring elements thereon, each of the latter overlying one of said support elements and urging the latter toward the transducer, thereby urging said bearing balls into swivel, bearing, supporting, sealing engagement with the transducer.

5. In a recording apparatus comprising a magnetic coated record surface moving in a direction of a coordinate of said surface, and a transducer support arm extending laterally of said record surface; a pair of tubular resilient support elements comprising a terminal portion of said arm, a bearing ball having an opening therethrough secured to a side of each of said terminal portions, a transducer having a plurality of air bearing orifices therein and having a pair of recesses each adapted to receive, in sealing relation, one of said bearing balls for universal pivotal movement therein and having a passage communicating the bearing orifices through the openings in the bearing balls with the interior of the tubular support elements, and a spring clip attached to said transducer and having a pair of spring elements thereon, each of the latter overlying one of said support elements and urging the latter toward the transducer, thereby urging said bearing balls into swivel, bearing, supporting, sealing engagement with the transducer.

6. In a recording apparatus comprising a magnetic coated record surface moving in a direction of a coordinate of said surface thereby to generate a laminar air flow along such surface, and a transducer support arm mounted for rocking movement and extending laterally of said surface; a pair of resilient support elements of similar material and of unequal length comprising a terminal portion of said arm, a bearing ball secured to a side of each of said terminal portions, a transducer formed for air bearing support on such record surface and having a pair of recesses each adapted to receive one of said bearing balls for universal pivotal movement therein, means for rocking the arm to move the transducer toward and away from said record surface, and spring means urging each spring element toward the transducer, thereby urging said bearing balls into swivel, bearing, supporting engagement with the transducer.

7. In a recording apparatus comprising a rotary record having a moving magnetic coated surface thereon, an arm extending substantially radially from said record and mounted for limited rocking movement about an axis extending transversely of the arm, an air bearing transducer mounted on a free end of said arm and having an air bearing orifice therein, and means for rocking the arm to move the transducer into and out of air bearing relation with such record; a pair of spring support elements of similar spring strength and of unequal length comprising the terminal portion of said arm adjacent said transducer, the longer of said elements being connected to a leading portion of such transducer relative to its movement to a record surface therebeneath, and the shorter, and therefore stiffer, of said elements being connected to the trailing edge of such transducer for the purpose of urging the trailing side of said transducer toward the record in advance of the leading side thereof.

8. In a recording apparatus comprising a rotary record having a moving, magnetic coated surface thereon, an arm extending substantially radially from said record and mounted for limited rocking movement about an axis extending transversely of the arm, an air bearing transducer mounted on a free end of said arm and having a plurality of air bearing orifices therein, and air actuated means for rocking the arm to move the transducer into and out of air bearing relation with such record; a pair of tubular spring support elements of similar spring strength and of unequal length comprising the terminal portion of said arm adjacent said transducer, the longer of said elements being connected to a leading portion of such transducer relative to its movement to a record surface therebeneath, and the shorter, and therefore stiffer, of said tubular elements being connected to the trailing edge of such transducer for the purpose of urging the trailing side of said transducer toward the record in advance of the leading side thereof, said air actuated means for rocking said arm communicating through said tubular support elements with the air bearing orifices in the transducer.

9. In a recording apparatus comprising a rotary record having a moving, magnetic coated surface thereon, a pair of arms extending substantially radially from, and on opposite sides of said record and mounted for limited rocking movement about an axis extending transversely of each arm; an air bearing transducer mounted on the free end of each arm and having a plurality of air bearing orifices therein, an axially extensible bellows interposed between said arms outwardly of their rock axes, a perforated bearing ball interposed between each end of the bellows and the arm adjacent thereto, a pair of tubular spring support elements of similar material and of unequal length comprising the inner terminal portion of each arm adjacent the transducer supported thereon, the longer of each pair of said elements being connected to a leading portion of such transducer relative to its movement to a moving record surface adjacent thereto, and the shorter, and therefore stiffer, of said elements being connected to the trailing edge of such transducer head for the purpose of urging the trailing side of said transducer head toward the record in advance of the leading side thereof, and compressed air supply means communicating through the perforated bearing balls and through said tubular support elements with the interior of said bellows and with the orifices in the transducers.

10. In a recording apparatus comprising a rotary magnetic record, a magnetic coated surface thereon, an indexing frame mounted radially outwardly of said record, a support arm journaled for rocking movement about rocking axis on said frame, and a transducer on the inner end of said arm for movement into and out of operative relation with said record upon rocking movement of said arm; actuating means for said arm comprising a bellows, a bearing ball secured externally to each end of said bellows, each bearing ball having a hole therethrough communicating with the interior of the bellows, one of said bearing balls being in pivoted, thrust engagement with a side of the arm at a point spaced outwardly from its axis of rocking support, the other of said bearing balls being in pivoted, thrust engagement with a frame supported element, spring means biasing the arm in a direction to move the transducer away from the record surface, said arm having an air passage therein communicating with the interior of the bellows through the hole in one of the bearing balls, and means communicating the air passage in said arm with a compressed air supply means, thereby to expand the bellows and rock the arm against the spring biasing means to bring the transducer thereon into operative relation with the magnetic coated record surface.

11. In a recording mechanism comprising a record having a moving magnetic recording surface thereon, an access frame, an access arm mounted for rocking movement about a rocking axis on said frame, and an air bearing transducer mounted on the inner end of said arm and having a surface thereof formed to conform to such recording surface and having bearing air orifices therein, said arm having an air passage therein communicating with the air bearing orifices in the transducer; arm actuating means comprising an axially extensible bellows, a bearing ball on one end of said bellows and supported for sealed, universal pivotal movement in a recess in said arm, said recess being spaced outwardly from the rocking axis of said arm and on a side thereof to urge the transducer toward such record upon an axial extension of the bellows, said bearing ball having an opening therethrough communicating the interior of the bellows with the air passage in said arm, the other end of said bellows being in thrust relation with a frame supported element, and means for supplying compressed air to said air passage for substantially simultaneous communication with the interior of said bellows and with the bearing air outlets in said transducer.

12. In a recording apparatus comprising a rotary magnetic record, a magnetic coated surface thereon, an indexing frame mounted radially outwardly of said record, a support arm journaled for rocking movement about rocking axis on said frame, and a transducer on the inner end of said arm for movement into and out of operative relation with said record upon rocking movement of said arm; actuating means for said arm comprising a bellows, a bearing ball secured externally to each end of said bellows, each bearing ball having a hole therethrough communicating with the interior of the bellows, one of said bearing balls being in pivoted, thrust engagement with a side of the arm at a point spaced outwardly from its axis of rocking support, the other of said bearing balls being in pivoted, thrust engagement with a frame supported element, spring means biasing the arm in a direction to move the transducer away from the record surface, said arm having an air passage therein communicating with the interior of the bellows through the hole in said one bearing ball, and means communicating the air passage in said arm with compressed air supply means, thereby to expand the bellows and rock the arm against the spring biasing means to bring the transducer into operative relation with the magnetic coated record surface.

13. In a recording apparatus comprising a rotary disk record, a magnetic coated surface on each side thereof, an indexing frame mounted radially outwardly of said record, a pair of support arms mounted on opposite sides of said record and journaled for rocking movement about parallel rocking axes on said frame, and an air bearing transducer on the inner end of each arm for movement into and out of operative relation with said record upon rocking movement of said arms, each transducer having a plurality of air bearing orifices therein, actuating means for said arms comprising a bellows interposed between said arms, a bearing ball secured externally to each end of said bellows, each bearing ball having a hole therethrough communicating with the interior of the bellows, each of said bearing balls being in pivoted, thrust engagement with a side of one of the arms at a point spaced outwardly from its axis of rocking support, spring means biasing the arms in a direction to move the transducers away from the record surfaces, each arm having an air passage therein communicating with the interior of the bellows through hole of the bearing balls, and with the orifices in the transducer mounted thereon, and means communicating the air passage in one of said arms with a compressed air supply means, thereby to expand the bellows and rock the arms against the spring biasing means to bring the transducers into operative relation with the magnetic coated record surface, and substantially simultaneously therewith to supply bearing air to the transducer orifices.

14. In a mechanism for magnetic recording including a record having a moving magnetic recording surface thereon, a transducer having a surface thereof formed to conform with the recording surface, and having a bearing orifice in said transducer surface; transducer support means including a flexible, tubular support arm member, a bearing ball interposed between the support arm member and a transducer member and having an opening therethrough communicating the interior of the tubular arm with the transducer orifice, said bearing ball being free for universal swivel movement with one of the members between which it is interposed, and secured against relative movement with the other of said members, and means resiliently biasing the arm member toward the transducer member.

References Cited in the file of this patent

UNITED STATES PATENTS

| | | |
|---|---|---|
| 2,250,512 | Vickers | July 29, 1941 |
| 2,612,566 | Anderson et al. | Sept. 30, 1952 |
| 2,862,781 | Baumeister | Dec. 2, 1958 |
| 2,886,651 | Vogel | May 12, 1959 |
| 2,937,240 | Harker | May 16, 1960 |

FOREIGN PATENTS

| | | |
|---|---|---|
| 764,434 | Great Britain | Dec. 28, 1956 |
| 179,901 | Austria | Oct. 25, 1954 |

UNITED STATES PATENT OFFICE

CERTIFICATE OF CORRECTION

Patent No. 3,018,152 January 23, 1962

Tyson G. Cowan

It is hereby certified that error appears in the above numbered patent requiring correction and that the said Letters Patent should read as corrected below.

Column 6, line 24, for "thereon", second occurrence, read -- thereof --; line 37, after "gripped" insert -- , sealing --.

Signed and sealed this 19th day of June 1962.

(SEAL)
Attest:

ERNEST W. SWIDER
Attesting Officer

DAVID L. LADD
Commissioner of Patents